(12) United States Patent
Liu et al.

(10) Patent No.: US 6,797,248 B2
(45) Date of Patent: Sep. 28, 2004

(54) MESOPOROUS MOLECULAR SIEVE AND A PROCESS FOR THE PREPARATION OF THE SAME

(75) Inventors: Quanjie Liu, Liaoning Province (CN); Jun Yang, Liaoning Province (CN); Yan Peng, Liaoning Province (CN)

(73) Assignees: China Petroleum and Chemical Corporation, Beijing (CN); Fushun Research Institute of Petroleum and Petrochemicals, SINOPEC Corp., Fushun (CN)

(*) Notice: Subject to any disclaimer, the term of this patent is extended or adjusted under 35 U.S.C. 154(b) by 392 days.

(21) Appl. No.: 09/983,628

(22) Filed: Oct. 25, 2001

(65) Prior Publication Data

US 2002/0127164 A1 Sep. 12, 2002

(30) Foreign Application Priority Data

Oct. 26, 2000 (CN) .......................... 00123144 A
Jan. 5, 2001 (CN) .......................... 01106006 A
Jan. 5, 2001 (CN) .......................... 01106007 A

(51) Int. Cl.[7] .................. C01B 25/36; C01B 25/45; C01F 17/00
(52) U.S. Cl. .................. 423/263; 423/305; 423/306
(58) Field of Search .................. 423/263, 305, 423/306

(56) References Cited

U.S. PATENT DOCUMENTS

| | | |
|---|---|---|
| 4,440,871 A | 4/1984 | Lok et al. |
| 4,500,651 A | 2/1985 | Lok et al. |
| 4,567,029 A | 1/1986 | Wilson et al. |
| 4,664,897 A | 5/1987 | Derouana et al. |
| 5,057,296 A | 10/1991 | Beck |
| 5,098,684 A * | 3/1992 | Kresge et al. .......... 423/305 |
| 5,102,643 A * | 4/1992 | Kresge et al. .......... 423/328 |
| 5,108,725 A * | 4/1992 | Beck et al. ............. 423/306 |
| 5,198,203 A | 3/1993 | Kresge et al. |
| 5,942,203 A | 8/1999 | Van Dijk et al. |
| 6,096,287 A | 8/2000 | Lee et al. |
| 6,284,696 B1 * | 9/2001 | Koya et al. .............. 502/64 |
| 6,447,741 B1 * | 9/2002 | Chester et al. .......... 423/305 |

* cited by examiner

Primary Examiner—Wayne A. Langel
(74) Attorney, Agent, or Firm—Birch, Stewart, Kolasch & Birch, LLP

(57) ABSTRACT

The present invention relates to a mesoporous molecular sieve MPL-1 and its preparation process. The anhydrous composition of this molecular sieve contains at least three elements, i.e. aluminum, phosphorus and oxygen. The molecular sieve has larger pore diameters, generally 1.3 nm–10.0 nm, a larger specific surface area and adsorption capacity. It is synthesized under the hydrothermal process with an organic compound as template. Where necessary, silicon and/or titanium may be added to synthesize the aluminosilicophosphate, aluminotitanophosphate, or aluminosilicotitanophosphate molecular sieves having a mesoporous structure, and/or metal compounds may be added to synthesize derivatives of mesoporous aluminophosphate molecular sieves containing the corresponding heteroatoms.

52 Claims, 1 Drawing Sheet

MPL-1(2) XRD

MESOPOROUS MOLECULAR SIEVE AND A PROCESS FOR THE PREPARATION OF THE SAME

This application claims priority of China 00123144.8, China 01106007.7 and China 01106006.9, filed Oct. 26, 2000, Jan. 5, 2001 and Jan. 5, 2001, respectively, the entire contents of which are hereby incorporated by reference.

BACKGROUND OF THE INVENTION

Technical Field

The present invention relates to a molecular sieve, especially a mesoporous molecular sieve, and a process for the preparation of the same.

DESCRIPTION OF THE RELATED ART

Porous inorganic materials have been widely applied in the catalysis and adsorption separation fields mainly because these materials possess an abundant microporous structure and a larger specific surface area and can provide a great number of acid sites and active adsorption sites. These materials may be roughly classified into amorphous and crystalline and modified pillared-layer materials.

Amorphous materials are important catalyst supports which have been used in industry for many years. The most typical one is amorphous silica-alumina, which is an acidic catalyst and an important support of the reforming catalyst in petrochemical industry. Here "amorphous" means that the long range is disordered but the short range is generally ordered. The most commonly used methods for characterizing these materials are X-ray diffraction, pore structure analysis and transmission electronic microscopy. The appearance of porous crystalline materials has enlarged the categories of the porous materials, and greatly enriched theory of the porous materials and brought the petrochemical industry a revolution. Especially since the application of the porous crystalline materials in industry results in astonishing economic benefits, people have been carrying out deeper and more perfect investigations on the porous crystalline materials. Porous crystalline materials possess a unique, regular crystalline structure, and each has a pore structure with a definite shape and size. Micropores connect the pores to form "giant molecules" with abundant pores. Since such a pore structure only permits the molecule with a definite size to pass, this material is referred to as "molecular sieve" and this property of molecular sieves has been widely applied. The structure of these molecular sieves, no matter whether they are synthetic or natural, generally has three-dimensional framework structure., Those kinds of molecular sieves only contain Si, Al and O elements are customarily denoted as "zeolite". Presently, many kinds of zeolites have been synthesized and widely applied, such as zeolite-A (U.S. Pat. No. 2,882,243), zeolite-X (U.S. Pat. No. 2,882,244), zeolite-Y (U.S. Pat. No. 3,130,007), ZSM-5 (U.S. Pat. No. 3,702,886), ZSM-11 (U.S. Pat. No. 3,709,979), etc. If Al or/and Si in the zeolites are partly or entirely substituted by other atoms, new types of molecular sieves will be formed. Now a variety of new types of molecular sieves have been synthesized and widely applied, such as SAPO series molecular sieves (U.S. Pat. Nos. 6,162,415, 5,370,851, 5,279,810, 5,230,881, 4,440,871, etc.), especially the SAPO-11 molecular sieves (U.S. Pat. Nos. 6,204,426, 6,111,160, 5,833,837, 5,246,566, 4,921,594, 4,499,315). Because these molecular sieves have a unique activity for the isomerization of long-chain alkanes, they are ideal components for the hydroisomerization of the wax in the lubricant oil fraction, and are widely used in the production of the basic oil of the top-grade lubricant oil.

Although the study on molecular sieves is quite mature, the pore diameters of most prepared molecular sieves are below 1.0 nm, and the maximum pore diameter reported in a literature is only 1.3 nm (Davis M E, Saldarriaga C, et al. Nature, 1991, 352: 320). Such molecular sieve still belongs to the micropore one which restricts the reaction of larger molecules. According to the definition of IUPAC, the material with pore diameter below 2 nm belongs to the microporous materials, and the material with pore diameter in the range of 2 nm to 50 nm belongs to the mesoporous material. Based on this definition, most of the prior molecular sieves belong to the microporous molecular sieves. Due to the development of the modern industry, the stricter and stricter environment protection law, and the worldwide tendency for the crude oil to become worse and heavier, it is an urgent task to develop a series of novel materials with super larger pore diameter and specific surface area, stable properties and excellent adsorptive and catalytic performances.

U.S. Pat. Nos. 5,108,725, 5,102,643, 5,098,684, and 5,057,296 disclose a process for synthesizing a mesoporous MCM-41 molecular sieve and its properties. This sort of molecular sieve has a structure of symmetric hexagonal. Its higher surface area, uniform pore distribution, adjustable pore diameter and acidity, accessible active sites, small diffusion resistance, ability to provide favorable space and effective acidic active sites for the large molecules, especially the heavy oil organic molecules to conduct the shape-selective reaction in the processes of petrochemical industry greatly encourage the chemical engineers. However, since the synthesis of such a molecular sieve requires large amounts of organic templates and auxiliary organic compounds such as cetyl trimethylammonium bromide (CTMAB), quaternary ammonium alkali and other organic compounds, and the resulting molecular sieve has so poor thermal stability (especially hydrothermal stability) that its crystal lattice can be retained in boiling water for only several hours or even shorter, it would be hard for them to have any value for practical applications.

Through the effort of recent years, some new mesoporous materials have been synthesized, but most of these materials are the improvements of MCM-41 which are, for example, synthesized by using new processes (U.S. Pat. Nos. 6,190,639, 6,096,287, 5,958,368, and 5,595,715, and Chinese Patent (Application) ZL 99103705.7, 96193321.6, and 95192999.2). Some hetero-atom substituted MCM-41 are synthesized (U.S. Pat. Nos. 6,193,943, 6,054,052, 6,042,807, 5,855,864, and 5,783,167, and Chinese Patent (Application) ZL.95105905.X, and 99107789.X) and thick wall MCM-41 is also synthesized (U.S. Pat. No. 6,193,943). However, the problem of the poor hydrothermal stability has not been substantively solved in these arts.

SUMMARY OF THE INVENTION

To overcome the shortages and problems of the above techniques, an object of the present invention is to provide a molecular sieve (hereinafter names it MPL-1), which has a character of mesoporous structure, larger and distribution concentrated pore diameters, larger specific surface and adsorption capacity, high thermal and hydrothermal stabilities. Meanwhile, a further object of the present invention is to provide a process for preparing such a molecular sieve.

The mesoporous molecular sieve provided by the present invention comprises at least three elements, i.e. phosphorus, aluminum, and oxygen, wherein the $P_2O_5/Al_2O_3$ molar ratio is 0.5–1.5, preferably 0.7–1.3, and most preferably 0.7–1.0, and has a specific X-ray diffraction pattern.

The molecular sieve according to the present invention has a X-ray diffraction pattern on which its strongest diffraction peak is at the position $2\theta=1.5°–13.0°$ with the units d-spacing greater than 4.0 nm, preferably 4.0 nm–6.0 nm. Particularly, the molecular sieve according to the present invention has substantively the same X-ray diffraction pattern as shown in FIG. 1.

The molecular sieve of the present invention has a pore diameter of 1.3 nm–10.0 nm, preferably 2.0 nm–10.0 nm, and most preferably 2.0 nm–5.0 nm.

The molecular sieve of the present invention may further contain elements Si and/or Ti, wherein the $T/Al_2O_3$ molar ratio is 0.01–2.0, preferably 0.01–1.0, wherein T represents Si and/or Ti.

Besides aluminum and/or titanium, the molecular sieve of the present invention may further contain one or more other metal elements. The molar ratio of said other metal(s) to alumina $M/Al_2O_3=0.01–2.0$, preferably 0.01–1.0, and most preferably 0.1–0.5, wherein M represents the other metal element(s).

The molecular sieve of the present invention has a pore volume of 0.30 ml/g–1.00 ml/g, preferably 0.40 ml/g–0.70 ml/g; and a specific surface area of 300 $m^2/g$-1000 $m^2/g$, preferably 500 $m^2/g$-800 $m^2/g$.

The molecular sieve of the present invention has excellent adsorption capacities towards benzene and water. Particularly, every 100 g of said molecular sieve has adsorption capacity towards benzene of more than 10 g, preferably 12 g–25 g at 25° C. and $P_S/P_O=0.016$, and every 100 g of said molecular sieve has adsorption capacity towards water of more than 50 g, preferably 52 g–70 g at 25° C. and $P_S/P_O=0.026$.

The molecular sieve of the present invention has higher thermal and hydrothermal stabilities. Its crystal lattice is not damaged after being calcined at 700° C. for 2 h and its crystallinity is not substantively decreased after being heated in boiling water for 10 h.

The other metal element in addition to aluminum, which may be used in the molecular sieve of the present invention, is one or more selected from the group consisting of La, Ce, Ti, Ni, Co, Cr, Ca, Cu, Zn, Mg, and Fe.

The molecular sieve of the present invention may be prepared by a process comprising the steps of:

(a) mixing a template, an aluminum source, and a phosphorus source with water, stirring the mixture and adjusting the pH value of the mixture to 6–11, wherein the molar ratio of various materials is $P_2O_5/Al_2O_3=$ 0.5–1.5, preferably 0.7–1.3, and most preferably 0.7–1.0; $H_2O/Al_2O_3=50–500$, preferably 100–400; $R/Al_2O_3=0.2–2.0$, preferably 0.3–1.0, where R is a template;

(b) crystallizing the resulting mixture of step (a) to form a precipitate, recovering and washing and drying the solid product to obtain the as-synthesised molecular sieve; and (c) calcining the as-synthesised molecular sieve of step (b) to remove the template to obtain the mesoporous molecular sieve of the present invention.

In the above synthetic process, it is possible to selectively add, where necessary, one or more silicon sources and titanium sources to step (a) to allow the $T/Al_2O_3$ molar ratio in the mixture obtained in step (a) to be 0.01–2.0, preferably 0.01–1.0, more preferably 0.1–0.5. Furthermore, it is possible to selectively add, where necessary, other metal sources in addition to the aluminum sources to allow the $M/Al_2O_3$ molar ratio in the mixture obtained in step (a) to be 0.01–2.0, preferably 0.01–1.0, and most preferably 0.1–0.5, wherein M represents the other metal element(s).

In the above synthetic process of the present invention the aluminum source is one or more selected from the group consisting of active aluminas and their precursors, soluble aluminum salts and organic aluminium-containing compounds; said phosphorus source may be inorganic or organic compounds containing phosphorus, such as orthophosphoric acid, phosphorous acid, pyrophosphoric acid, phosphorus trichloride, phosphorus oxychloride, and phosphates, etc., preferably orthophosphoric acid; said silicon source is generally one or more selected from the group consisting of silica sol, white carbon black, water glass and ortho-silicate; the titanium source is one or more selected from the group consisting of $TiO_2$, $TiF_4$, $TiCl_4$, $TiOCl_2$, $Ti(SO_4)_2$, tetramethyl titanate, tetraethyl titanate, and tetrapropyl titanate, and the derivatives thereof.

In the above process, said other metal source other than aluminum prefers the soluble salts such as one or more metal-containing compounds selected from the group consisting of the nitrate, sulfate, acetate and chloride of La, Ce, Ti, Ni, Co, Cr, Ca, Cu, Zn, Mg and Fe.

The template used in the above synthetic process may be represented by the general formula: $R_1R_2R_3R_4NX$, wherein $R_1$, $R_2$, $R_3$, and $R_4$ independently represent a substituting group, N represents element nitrogen or phosphorus, and X represents hydroxyl or halogen such as F, Cl, Br, or I. Besides, at least one substituting group among said $R_1$, $R_2$, $R_3$, and $R_4$ is a group containing 5 or more carbon atoms, such as cetyl trimethylammonium chloride (CTMAC), cetyl trimethylammonium bromide (CTMAB), octadecyl trimethylammonium salts. It is preferred that at least one substituting group among $R_1$, $R_2$, $R_3$, and $R_4$ contains one or more polar functional groups, which can be selected from a group consisting of amino, hydroxyl, carboxyl, sulfhydryl, aldehyde group, and halogens such as F, Cl, Br or I. The most preferred ones are phenethoxy-2-hydroxypropyl trimethylammonium chloride (PTMAC) and/or phenethoxy-2-hydroxypropyl trimethylammonium bromide (PTMAB) or a mixture of phenethoxy-2-hydroxypropyl trimethylammonium chloride (PTMAC) and/or phenethoxy-2-hydroxypropyl trimethylammonium bromide (PTMAB) with other organic compounds capable of serving as a template.

The pH value of said mixture in step (a) of the above process is preferably 7–10, and more preferably 7.5–9.0. The substances used to adjust the pH of the mixture may include any substance capable of adjusting acidity and alkalinity such as acids, alkalis or salts, preferably inorganic or organic alkalis such as sodium hydroxide, potassium hydroxide, aqueous ammonia, primary amines, secondary amines, tertiary amines, or quaternary ammonium alkali, more preferably quaternary ammonium alkali and/or aqueous ammonia.

In step (b) of the synthetic process of the present invention, said crystallization temperature is 100° C.–200° C., preferably 130° C.–170° C., and the crystallization time is 4 h–240 h, preferably 24 h–96 h; said calcination temperature in step (c) is 450° C.–700° C., preferably 500° C.–650° C., and calcination time is 2 h–24 h, preferably 4 h–8 h.

Compared to the prior art, the present invention has the following advantages: The mesoporous molecular sieve according to the present invention has larger and distribution concentrated pore diameters, larger specific surface area and adsorption capacity, higher thermal and hydrothermal stabilities, moderate and adjustable acidity and amount of the acid. It can be directly used as a catalyst or a support with special function and can provide a great number of active sites and space for reaction and reduce the diffusion resistance of reactants and products, thereby raising the activity and selectivity of the reaction. Therefore, it is a support of catalyst and adsorbent with excellent performance, and has great value for potential application. Besides, the templates used in the synthetic process of the mesoporous molecular sieve provided by the present invention are a sort of organic compounds with special structure. The present invention has the advantages that the process is simple and the operation is easy.

DETAILED DESCRIPTION

Figure 1:
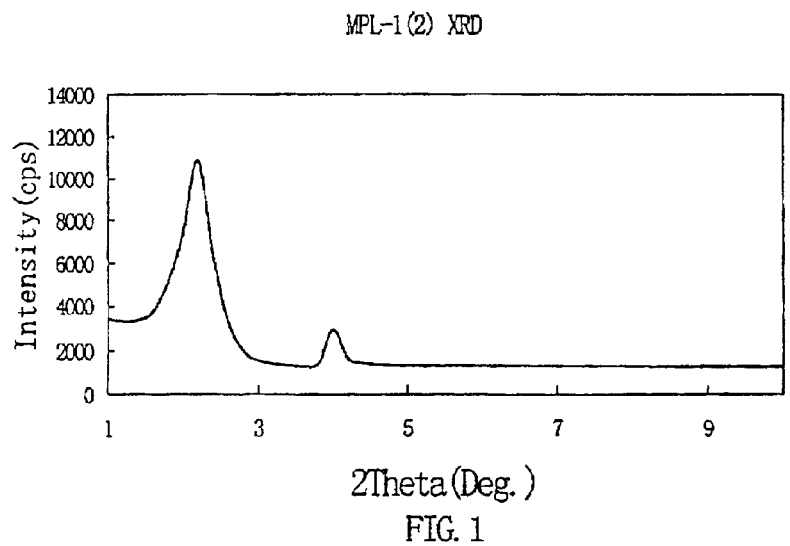
FIG. 1 shows the X-ray diffraction (XRD) pattern of the product molecular sieve of Example 2.
Figure 2:
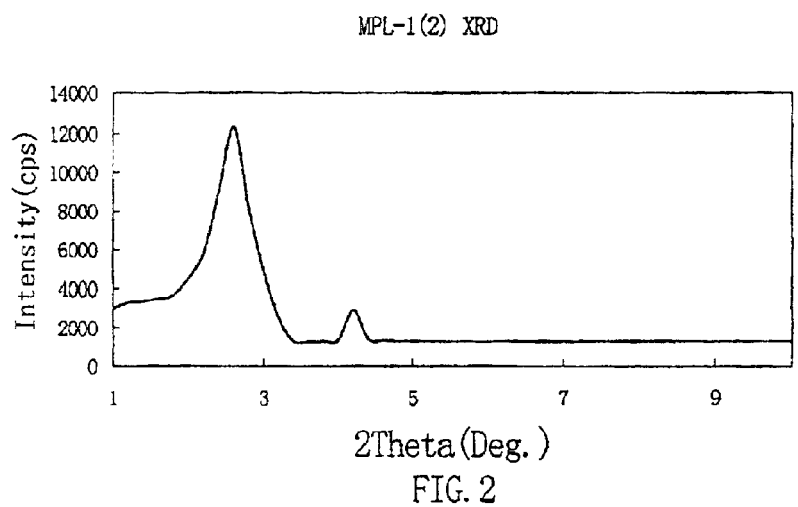
FIG. 2 shows the X-ray diffraction (XRD) pattern of the product molecular sieve of Example 2 after calcined at 700° C. for 2 h.
Figure 3:
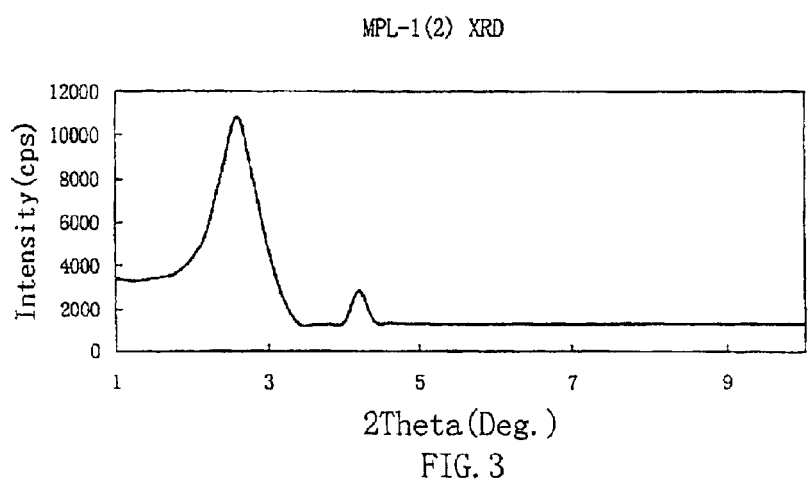
FIG. 3 shows the X-ray diffraction (XRD) pattern of the product molecular sieve of Example 2 after heated in boiling water for 10 h.

The X-ray diffraction (XRD) patterns were recorded on a Japanese Science DIMAX-RA model X-ray diffractometer, wherein the radiation source is a copper target, graphite monocrystal is used as the wave filter, me tube pressure is 35 kV, tube current is 30 mA-50 mA, scanning rate (2θ) is 4°/min, and scanning range is 1–100.

Tables 1–2 list the reaction conditions and product properties of the Examples, and Table 3 lists the reservation of the crystallinity of several products of Examples after calcined at 700° C. for 2 h and heated in boiling water for 10 h. The specific surface area and pore structure were determined with the ASAP 2400 Automatic Adsorption Instrument, the adsorption and desorption isotherms of the samples were measured at the temperature of liquid nitrogen, and the specific surface area and pore structure were calculated by the BET method.

The present invention will further be described below through the following Examples, which should not be construed as limitations to the protection scope of the claims.

EXAMPLE 1

Synthesis of Template A (phenethoxy-2-hydroxypropyltrimethylammonium Chloride)

a. Synthesis of Phenethyl Glycidic Ester

Into a 2000 ml three-necked flask were sequentially added 122 g (1 mole) of phenethyl alcohol, 240 g of 50 wt % sodium hydroxide solution and 1000 ml of toluene. The mixture was stirred magnetically at room temperature for 1 h, then 184 g (2 mole) of epoxy chloropropane was added. The resulting solution was heated to 75° C. and allowed to react for 6 h under intensive stirring, and the stirring was stopped after the solution was cooled down. The lower layer solution was separated with a separating funnel. The upper layer solution was put into a rotatory evaporator to recover toluene and unreacted epoxy chloropropane and obtain 171 g (0.96 mole) of the product phenethyl glycidic ester with a yield of 96 wt %.

b. Synthesis of Phenethoxy-2-Hydroxypropyltrimethylammonium Chloride (Template A)

Into a 1000 ml of three-necked flask were sequentially added 142 g (0.8 mole) of phenethyl glycidic ester of step (a), 100 g of a solution containing 48 g (0.8 mole) of trimethyl amine and 500 ml of anhydrous ethanol. The solution was neutralized to neutrality with 37 wt % of hydrochloric acid and refluxed for 2 h to conduct the reaction and then ethyl alcohol and water were evaporated. The residue was recrystallized with acetone and petroleum ether (the volume ratio of acetone to petroleum ether was 2:1) twice, and then vacuum dried at room temperature to obtain 191 g (0.70 mole) of product phenethoxy-2-hydroxypropyltrimethylammonium chloride with a yield of 87 wt %.

EXAMPLE 2

23 g of 85 wt % orthophosphoric acid was mixed with 50 g of deionized water, then 34.2 g of $Al_2(SO_4)_3$ was added. The mixture was heated to 45° C. on a water-bath. After mixing to make it uniform, 5.4 g of phenethoxy-2-hydroxypropyltrimethylammonium chloride (PTMAC) and 40 g deionized water were added and stirred thoroughly. The pH value of the reaction mixture was adjusted with triethyl amine to 6.5 to yield a mixture, the mole composition of which was:

$P_2O_5/Al_2O_3=1.0$ $H_2O/Al_2O_3=50$ $R/Al_2O_3=0.2$

The above mixture was transferred to an autoclave pressure lined with Teflon inside, and statically crystallized at 160° C. for 60 h. The solid obtained after filtering the reaction product was washed with water thoroughly, dried at 110° C. for 4 h, and then measured by X-ray diffraction. The result exhibits a strong peak at 2θ=2.101, and the units d-spacing d=4.24724 nm. This result demonstrates that the obtained synthetic product was a mesoporous molecular sieve, the solid product was calcined at 550° C. for 3 hours in air, the anhydrous mole composition of which was:

$P_2O_5/Al_2O_3=1$

The specific surface area of the molecular sieve was 317 m²/g, and the pore volume was 0.35 ml/g. 92% of the pore diameter was distributed in 2.0 nm–2.3 nm. The adsorption capacity of 100 g of sample towards benzene at 25° C. and $P_S/P_O=0.016$ was greater than 12.2 g, and the adsorption capacity of 100 g of sample towards water at 25° C. and $P_S/P_O=0.026$, was 51.6 g.

EXAMPLE 3

34.5 g of 85 wt % orthophosphoric acid was mixed with 50 g of deionized water, then 14.2 g of pseudo-diaspore containing 28 wt % water was added. The mixture was heated to 50° C. on a water-bath. After mixing to make it uniform, 54.4 g of phenethoxy-2-hydroxypropyltrimethylammonium chloride (PTMAC) and 140 g deionized water were added and the mixture was stirred thoroughly. The pH value of the reaction mixture was adjusted with sodium hydroxide to 6.0 to yield a mixture, the mole composition of which was:

$P_2O_5/Al_2O_3=1.5$ $H_2O/Al_2O_3=100$ $R/Al_2O_3=2.0$

The crystallization conditions are shown in Table 1, the properties of the product are shown in Table 2, and the anhydrous mole composition was:

$P_2O_5/Al_2O_3=0.98$.

EXAMPLE 4

16.1 g of 85 wt % orthophosphoric acid was mixed with 120 g of deionized water, then 40.8 g of aluminum isopropoxide was added. The mixture was heated to 30° C. on a water-bath. After mixing to make it uniform, 27.2 g of phenethoxy-2-hydroxypropyltrimethylammonium chloride (PTMAC) and 600 g deionized water were added and the mixture was stirred thoroughly. The pH value of the reaction mixture was adjusted with aqueous ammonia to 11.0 to yield a mixture, the mole composition of which was:

$P_2O_5/Al_2O_3=0.7$ $H_2O/Al_2O_3=400$ $R/Al_2O_3=1.0$

The crystallization conditions are shown in Table 1, the properties of the product are shown in Table 2, and the anhydrous mole composition was:

$P_2O_5/Al_2O_3=0.97$.

EXAMPLE 5

The same as in Example 3, but 21.4 g of ethyl orthosilicate was additionally added. The mole composition of the obtained mixture was:

$Si/Al_2O_3=1.0$ $P_2O_5/Al_2O_3=1.5$ $H_2O/Al_2O_3=100$ $R/Al_2O_3=2.0$

The crystallization conditions are shown in Table 1, the properties of the product are shown in Table 2, and the anhydrous mole composition was:

$Si/Al_2O_3=1.05$ $P_2O_5/Al_2O_3=0.98$.

EXAMPLE 6

25.3 g of 85 wt % orthophosphoric acid was mixed with 50 g of deionized water, then 42 g of $Al(NO_3)_3$ was added. After mixing to make it uniform at room temperature, 27.2 g of phenethoxy-2-hydroxypropyltrimethylammonium chloride (PTIMAC), 19 g of $TiCl_4$ and 40 g of deionized water were added and the mixture was stirred thoroughly. The pH value of the reaction mixture was adjusted with aqueous ammonia to 9.5 to yield a mixture, the mole composition of which was:

$P_2O_5/Al_2O_3=1.1$ $Ti/Al_2O_3=1.0$ $H_2O/Al_2O_3=50$ $R/Al_2O_3=1.0$

The crystallization conditions are shown in Table 1, the properties of the product are shown in Table 2, and the anhydrous mole composition was:

$Ti/Al_2O_3=0.98$ $P_2O_5/Al_2O_3=0.94$

EXAMPLE 7

The same as in Example 6, but extra 0.6 g of white carbon black was added. The mole composition of the obtained mixture was:

$Si/Al_2O_3=0.1$ $P_2O_5/Al_2O_3=1.1$ $Ti/Al_2O_3=1.0$ $H_2O/Al_2O_3=50$ $R/Al_2O_3=1.0$

The crystallization conditions are shown in Table 1, the properties of the product are shown in Table 2, and the anhydrous mole composition was:

$Si/Al_2O_3=0.10$ $P_2O_5/Al_2O_3=0.92$ $Ti/Al_2O_3=0.96$

EXAMPLE 8

The same as in Example 2, but extra 0.2 g of ethyl orthosilicate and 1.8 g of $Ni(NO_3)_2$ were added. The mole composition of the obtained mixture was:

$Si/Al_2O_3=0.01$ $P_2O_5/Al_2O_3=1.0$ $Ni/Al_2O_3=0.1$ $H_2O/Al_2O_3=50$ $R/Al_2O_3=0.2$

The crystallization conditions are shown in Table 1, the properties of the product are shown in Table 2, and the anhydrous mole composition was:

$Si/Al_2O_3=0.01$ $P_2O_5/Al_2O_3=0.94$ $Ni/Al_2O_3=0.12$

EXAMPLE 9

The same as in Example 4, but extra 8.0 g of silica sol containing 30 wt % $SiO_2$, and 8.0 g of $ZnSO_4$ were added. The mole composition of the obtained mixture was:

$Si/Al_2O_3=0.4$ $P_2O_5/Al_2O_3=0.7$ $Zn/Al_2O_3=0.5$ $H_2O/Al_2O_3=400$ $R/Al_2O_3=1.0$

The crystallization conditions are shown in Table 1, the properties of the product are shown in Table 2, and the anhydrous mole composition was:

$Si/Al_2O_3=0.38$ $P_2O_5/Al_2O_3=0.69$ $Zn/Al_2O_3=0.52$

EXAMPLE 10

27.6 g of 85 wt % orthophosphoric acid was mixed with 100 g of deionized water, then 51.6 g of $KAl(SO_4)_2$ was added. After mixing to make it uniform at room temperature, 4 g of silica sol containing 30 wt % $SiO_2$, 27.2 g of phenethoxy-2-hydroxypropyltrimethylammonium chloride (PTMAC), 2.5 g of $CuSO_4.0.5H_2O$ and 160 g deionized water were sequentially added and the mixture was stirred thoroughly. The pH value of the reaction mixture was adjusted with aqueous ammonia to 10.5 to yield a mixture, the mole composition of which was:

$Si/Al_2O_3=0.2$ $P_2O_5/Al_2O_3=1.2$ $Cu/Al_2O_3=0.1$ $H_2O/Al_2O_3=150$ $R/Al_2O_3=1.0$

The crystallization conditions are shown in Table 1, the properties of the product are shown in Table 2, and the anhydrous mole composition was:

$Si/Al_2O_3=0.22$ $P_2O_5/Al_2O_3=1.04$ $Cu/Al_2O_3=0.08$

EXAMPLE 11

27.6 g of 85 wt % orthophosphoric acid was mixed with 100 g of deionized water, then 26.7 g of $AlCl_3$ was added. The mixture was heated to 70° C. on a water-bath. After mixing to make it uniform, 4 g of silica sol containing 30 wt % $SiO_2$, 27.2 g of phenethoxy-2-hydroxypropyltrimethylammonium chloride (PTMAC), 3.2 g of $La(NO_3)_3$ and 160 g deionized water were sequentially added and the mixture was stirred thoroughly. The pH value of the reaction mixture was adjusted with aqueous ammonia to 10.0 to yield a mixture, the mole composition of which was:

$Si/Al_2O_3=0.2$ $P_2O_5/A_2O_3=1.2$ $La/Al_2O_3=0.1$ $H_2O/Al_2O_3=150$ $R/Al_2O_3=1.0$

The crystallization conditions are shown in Table 1, the properties of the product are shown in Table 2, and the mole composition was:

$Si/Al_2O_3=0.19$ $P_2O_5/Al_2O_3=0.98$ $La/Al_2O_3=0.09$

EXAMPLE 12

The same as in Example 10, but 26.7 g of $AlCl_3$ was substituted with 14.2 g pseudo-diaspore containing 28 wt % water, and 3.2 g of $La(NO_3)_3$ was substituted with 5.3 g of $Ce(NO_3)_3$. The mole composition of the mixture was:

$Si/Al_2O_3=0.2$ $P_2O_5/Al_2O_3=1.2$ $Ce/Al_2O_3=0.2$ $H_2O/Al_2O_3=150$ $R/Al_2O_3=1.0$

The crystallization conditions are shown in Table 1, the properties of the product are shown in Table 2, and the mole composition was:

$Si/Al_2O_3=0.18$ $P_2O_5/Al_2O_3=1.02$ $Ce/Al_2O_3=0.19$

EXAMPLE 13

The same as in Example 11, but 27.6 g of 85 wt % of orthophosphoric acid was substituted with 33 g of $PCl_3$, and 5.3 g of $Ce(NO_3)_3$ was substituted with 2.7 g of $Co(AcO)_2$. The mole composition of the mixture was:

$Si/Al_2O_3=0.2$ $P_2O_5/Al_2O_3=1.2$ $Co/Al_2O_3=0.15$ $H_2O/Al_2O_3=150$ $R/Al_2O_3=1.0$

The crystallization conditions are shown in Table 1, the properties of the product are shown in Table 2, and the mole composition was:

$Si/Al_2O_3=0.18$ $P_2O_5/Al_2O_3=0.99$ $Co/Al_2O_3=0.14$

EXAMPLE 14

The same as in Example 12, but 2.7 g of $Co(AcO)_2$ was substituted with 1.9 g of $CrCl_3$. The mole composition of the mixture was:

$Si/Al_2O_3=0.2$ $P_2O_5/Al_2O_3=1.2$ $Cr/Al_2O_3=0.12$ $H_2O/Al_2O_3=150$ $R/Al_2O_3=1.0$

The crystallization conditions are shown in Table 1, the properties of the product are shown in Table 2, and the anhydrous mole composition was:

$Si/Al_2O_3=0.21$ $P_2O_5/Al_2O_3=0.97$ $Cr/Al_2O_3=0.12$

EXAMPLE 15

The same as in Example 12, but 2.79 of $Co(AcO)_2$ was substituted with 2.2 g of $CaCl_2$. The mole composition of the mixture was:

$Si/Al_2O_3=0.2$ $P_2O_5/A_2O_3=1.2$ $Ca/Al_2O_3=0.2$ $H_2O/Al_2O_3=150$ $R/Al_2O_3=1.0$

The crystallization conditions are shown in Table 1, the properties of the product are shown in Table 2, and the mole composition was:

$Si/Al_2O_3=0.21$ $P_2O_5/Al_2O_3=0.96$ $Ca/Al_2O_3=0.21$

EXAMPLE 16

The same as in Example 12, but 2.7 g of $Co(AcO)_2$ was substituted with 4.8 g of $MgSO_4$ The mole composition of the mixture was:

$Si/Al_2O_3=0.2$ $P_2O/Al_2O_3=1.2$ $Mg/Al_2O_3=0.4$ $H_2O/Al_2O_3=150$ $R/Al_2O_3=1.0$

The crystallization conditions are shown in Table 1, the properties of the product are shown in Table 2, and the anhydrous mole composition was:

$Si/Al_2O_3=0.19$ $P_2O_5/Al_2O_3=1.30$ $Mg/Al_2O_3=0.41$

EXAMPLE 17

The same as in Example 12, but 2.7 g of $Co(AcO)_2$ was substituted with 1.6 g of $FeCl_3$. The mole composition of the mixture was:

$Si/Al_2O_3=0.2$ $P_2O_5/Al_2O_3=1.2$ $Fe/Al_2O_3=0.1$ $H_2O/Al_2O_3=150$ $R/Al_2O_3=1.0$

The crystallization conditions are shown in Table 1, the properties of the product are shown in Table 2, and the anhydrous mole composition was:

$Si/Al_2O_3=0.22$ $P_2O_5/Al_2O_3=0.99$ $Fe/Al_2O_3=0.1$

EXAMPLE 18

The same as in Example 12, but 2.7 g of $Co(AcO)_2$ was substituted with 0.9 g of $Ni(NO_3)_2$ and 2.8 g of $ZnSO_4$. The mole composition of the mixture was:

$Si/Al_2O_3=0.2$ $P_2O_5/Al_2O_3=1.2$ $Zn/Al_2O_3=0.05$ $Fe/Al_2O_3=0.1$ $Ni/Al_2O_3=0.05$ $H_2O/Al_2O_3=150$ $R/Al_2O_3=1.0$

The crystallization conditions are shown in Table 1, the properties of the product are shown in Table 2, and the anhydrous mole composition was:

$Si/Al_2O_3=0.21$ $P_2O_5/Al_2O_3=0.98$ $Ni/Al_2O_3=0.05$ $Zn/Al_2O_3=0.05$

EXAMPLE 19

The same as in Example 6, but 54.4 g of phenethoxy-2-hydroxypropyl trimethylammonium chloride (PTMAC) was substituted with 32 y of cetyl trimethylammonium chloride (CTMAC). The mole composition of the mixture was:

$Si/Al_2O_3=31.0$ $P_2O_5/Al_2O_3=1.5$ $H_2O/A_2O_3=100$ $R/Al_2O_3=1.0$

The crystallization conditions are shown in Table 1, the properties of the product are shown in Table 2, and the anhydrous mole composition was:

$Si/Al_2O_3=1.02$ $P_2O_5/Al_2O_3=0.97$

EXAMPLE 20

25.3 g of 85 wt % orthophosphoric acid was mixed with 50 g of deionized water, then 42 g of $Al(NO_3)_3$ was added. After mixing to make it uniform at room temperature, 27.2 g of phenethoxy-2-hydroxypropyltrimethylammonium chloride (PTMAC), 19 g of $TiCl_4$ and 40 g deionized water were added and the mixture was stirred thoroughly. The pH value of the reaction mixture was adjusted with aqueous ammonia to 9.5 to yield a mixture, the mole composition of which was:

$P_2O_5/Al_2O_3=1.1$ $Ti/Al_2O_3=1.0$ $H_2O/Al_2O_3=50$ $R/Al_2O_3=1.0$

The crystallization conditions are shown in Table 1, the properties of the product are shown in Table 2, and the anhydrous mole composition was:

$Ti/Al_2O_3=0.98$ $P_2O_5/Al_2O_3=0.94$

EXAMPLE 21

The same as in Example 6, but 25.3 g of 85 wt % orthophosphoric acid was substituted with 35 g of trimethyl phosphate, and extra 3.2 g of cetyl trimethylammonium chloride (CTMAC) was added. The mole composition of the obtained mixture was:

$Si/Al_2O_3=0.1$ $P_2O_5/Al_2O_3=1.1$ $Ti/Al_2O_3=1.0$ $H_2O/Al_2O_3=50$ $R/Al_2O_3=1.1$

The crystallization conditions are shown in Table 1, the properties of the product are shown in Table 2, and the anhydrous mole composition was:

$Si/Al_2O_3=0.10$ $P_2O_5/Al_2O_3=0.94$ $Ti/Al_2O_3=1.0$

EXAMPLE 22

The same as in Example 7, but 27.2 g of phenethoxy-2-hydroxypropyl trimethylammonium chloride (PTMAC) was substituted with 16 g of cetyl trimethylammonium chloride (CTMAC) and 13.6 g of phenethoxy-2-hydroxypropyltrimethylammonium chloride (PTMAC). The mole composition of the obtained mixture was:

$Si/Al_2O_3=0.4$ $P_2O_5/Al_2O_3=0.7$ $Zn/Al_2O_3=0.5$ $H_2O/Al_2O_3=400$ $R/Al_2O_3=1.0$

The crystallization conditions are shown in Table 1, the properties of the product are shown in Table 2, and the anhydrous mole composition was:

$Si/Al_2O_3=0.41$ $P_2O_5/Al_2O_3=0.66$ $Zn/Al_2O_3=0.48$

EXAMPLE 23

The same as in Example 3, but extra 1.6 g of $FeCl_3$ was added. The mole composition of the obtained mixture was:

$P_2O_5/Al_2O_3=1.5$ $Fe/Al_2O_3=0.1$ $H_2O/Al_2O_3=100$ $R/Al_2O_3=2.0$

The crystallization conditions are shown in Table 1, the properties of the product are shown in Table 2, and the anhydrous mole composition was:

$P_2O_5/Al_2O_3=0.98$ $Fe/Al_2O_3=0.1$

TABLE 1

The crystallization conditions as used in the Examples

| Ex. Nos. | crystallization temperature (° C.) | PH of the mixture | crystallization time (h) | calcination temperature (° C.) | calcination time (h) |
|---|---|---|---|---|---|
| 2 | 160 | 6.5 | 60 | 550 | 3 |
| 3 | 120 | 9.0 | 48 | 580 | 2 |
| 4 | 140 | 8.0 | 24 | 650 | 1 |
| 5 | 180 | 6.0 | 16 | 600 | 4 |
| 6 | 130 | 9.5 | 48 | 550 | 6 |
| 7 | 130 | 9.5 | 48 | 550 | 6 |
| 8 | 100 | 7.5 | 96 | 450 | 12 |
| 9 | 160 | 11.0 | 24 | 650 | 2 |
| 10 | 150 | 10.5 | 24 | 580 | 4 |
| 11 | 150 | 10.0 | 48 | 600 | 4 |
| 12 | 150 | 10.0 | 48 | 500 | 8 |
| 13 | 140 | 10.0 | 60 | 520 | 8 |
| 14 | 160 | 10.5 | 48 | 590 | 4 |
| 15 | 160 | 9.5 | 48 | 600 | 4 |
| 16 | 160 | 10.0 | 48 | 600 | 4 |
| 17 | 160 | 10.0 | 48 | 600 | 4 |
| 18 | 160 | 10.0 | 48 | 600 | 4 |
| 19 | 180 | 6.0 | 16 | 600 | 4 |
| 20 | 130 | 9.5 | 24 | 550 | 6 |
| 21 | 130 | 9.5 | 48 | 550 | 6 |
| 22 | 160 | 11.0 | 24 | 650 | 2 |
| 23 | 120 | 9.0 | 48 | 580 | 2 |

TABLE 2

Properties of the products in the examples

| Ex. Nos. | 2θ (DEG) | d-value (Å) | Specific surface area (m²/g) | Pore volume (ml/g) | Most probable diameter (nm) | Adsorption capacity towards benzene[1] (g) | Adsorption capacity towards water[2] (g) |
|---|---|---|---|---|---|---|---|
| 2 | 2.10 | 42.4724 | 317 | 0.35 | 2.1 | 12.2 | 51.6 |
| 3 | 2.24 | 46.3528 | 366 | 0.41 | 2.4 | 14.1 | 54.0 |
| 4 | 2.18 | 44.5762 | 344 | 0.38 | 2.3 | 13.6 | 53.2 |

TABLE 2-continued

Properties of the products in the examples

| Ex. Nos. | 2θ (DEG) | d-value (Å) | Specific surface area (m²/g) | Pore volume (ml/g) | Most probable diameter (nm) | Adsorption capacity towards benzene[1] (g) | Adsorption capacity towards water[2] (g) |
|---|---|---|---|---|---|---|---|
| 5 | 2.69 | 48.6612 | 920 | 0.64 | 4.6 | 19.7 | 64.3 |
| 6 | 2.67 | 48.2766 | 865 | 0.62 | 4.1 | 18.0 | 59.9 |
| 7 | 2.58 | 49.2252 | 843 | 0.60 | 3.5 | 17.0 | 58.0 |
| 8 | 2.18 | 55.4218 | 477 | 0.41 | 2.7 | 14.8 | 53.2 |
| 9 | 2.54 | 50.1230 | 576 | 0.48 | 3.4 | 16.4 | 56.0 |
| 10 | 2.60 | 49.1256 | 633 | 0.53 | 3.4 | 15.9 | 56.2 |
| 11 | 3.05 | 44.4652 | 518 | 0.41 | 3.2 | 15.3 | 54.6 |
| 12 | 2.84 | 46.2724 | 556 | 0.45 | 3.6 | 16.8 | 57.7 |
| 13 | 2.67 | 47.0823 | 605 | 0.46 | 3.7 | 17.2 | 58.4 |
| 14 | 2.57 | 48.2519 | 633 | 0.49 | 3.7 | 17.4 | 59.1 |
| 15 | 2.44 | 52.0734 | 701 | 0.52 | 3.8 | 18.3 | 61.3 |
| 16 | 2.66 | 46.2572 | 642 | 0.48 | 3.5 | 15.8 | 55.6 |
| 17 | 2.63 | 46.8852 | 658 | 0.48 | 3.4 | 16.1 | 56.8 |
| 18 | 2.52 | 49.0811 | 587 | 0.44 | 3.2 | 15.7 | 54.4 |
| 19 | 2.62 | 49.3319 | 946 | 0.67 | 4.3 | 19.2 | 63.8 |
| 20 | 2.54 | 48.6736 | 826 | 0.52 | 3.5 | 16.4 | 55.5 |
| 21 | 2.52 | 50.2180 | 877 | 0.57 | 3.6 | 16.9 | 57.3 |
| 22 | 2.47 | 50.4726 | 652 | 0.51 | 3.3 | 16.2 | 55.1 |
| 23 | 2.37 | 47.1744 | 422 | 0.44 | 2.7 | 16.7 | 53.3 |

Notes:
[1]100 g of sample, 25° C., $P_s/P_o$=0.016.
[2]100 g of sample, 25° C., $P_s/P_o$=0.026.

TABLE 3

Results on thermal and hydrothermal stabilities

| Ex. Nos. | A (%) | B (%) | C (%) |
|---|---|---|---|
| 0 | 100 | 74 | 0 |
| 2 | 100 | 103 | 99 |
| 3 | 100 | 112 | 96 |
| 4 | 100 | 108 | 92 |
| 5 | 100 | 120 | 92 |
| 6 | 100 | 117 | 90 |
| 7 | 100 | 104 | 96 |
| 8 | 100 | 110 | 90 |
| 15 | 100 | 109 | 91 |
| 21 | 100 | 122 | 95 |

Notes: The No.0 is a zeolite Si-MCM-41 synthesized according to a process as disclosed in published literature (Kresge C. T, Leonowies M. J, Roth W. J, et al; Nature, 1992. 359:710); A represents the relative crystallinity of the original powder of the synthesized molecular sieve; B represents the relative crystallinity of the molecular sieve after being calcinated at 700 for 2 h; C represents the relative crystallinity of the molecular sieve after being heated in boiling water for 10 h.

What is claimed is:

1. A mesoporous molecular sieve comprising phosphorus, aluminum, and oxygen, wherein a $P_2O_5/Al_2O_3$ molar ratio is 0.5–1.5; and having a X-ray diffraction pattern on which its strongest diffraction peak is at the position 2θ=1.5°–3.0° with the units d-spacing greater than 4.0 nm.

2. The mesoporous molecular sieve according to claim 1, wherein a pore diameter of the molecular sieve is 1.3 nm–10.0 nm.

3. The mesoporous molecular sieve according to claim 2, wherein said pore diameter is 2.0 nm–10.0 nm.

4. The mesoporous molecular sieve according to claim 2, wherein said pore diameter is 2.0 nm–5.0 nm.

5. The mesoporous molecular sieve according to claim 1, wherein said $P_2O_5/Al_2O_3$ molar ratio is 0.7–1.3.

6. The mesoporous molecular sieve according to claim 1, wherein said $P_2O_5/Al_2O_3$ molar ratio is 0.7–1.0.

7. The mesoporous molecular sieve according to claim 1, wherein said molecular sieve further comprises elements Si and/or Ti, wherein a $T/Al_2O_3$ molar ratio is from 0.01 to less than 2.0, wherein T represents Si and/or Ti.

8. The mesoporous molecular sieve according to claim 7, wherein said $T/Al_2O_3$ molar ratio is 0.01–1.0, wherein T represents Si and/or Ti.

9. The mesoporous molecular sieve according to claim 7, wherein said molecular sieve further comprises one or more other metal elements in addition to the elements aluminum and/or titanium, and a molar ratio of said other metal element(s) to alumina $M/Al_2O_3$=0.01–2.0, wherein M represents the other metal element(s).

10. The mesoporous molecular sieve according to claim 9, wherein said molar ratio of other metal element(s) to alumina $M/Al_2O_3$=0.01–1.0, wherein M represents the other metal element(s).

11. The mesoporous molecular sieve according to claim 9, wherein said molar ratio of other metal element(s) to alumina $M/Al_2O_3$=0.1–0.5, wherein M represents the other metal element(s).

12. The mesoporous molecular sieve according to claim 1, wherein said interplanar distance of the strongest diffraction peak d=4.0–6.0 nm.

13. The mesoporous molecular sieve according to claim 1, wherein said molecular sieve has substantively the same X-ray diffraction pattern with the strongest diffraction peak at 2θ=1.7 degree to 2.9 degree, and a second strongest diffraction peak at 2θ=3.8 degree to 4.2 degree.

14. The mesoporous molecular sieve according to claim 1, wherein said molecular sieve has a pore volume of 0.30 ml/g–1.00 ml/g, and a specific surface area of 300 m²/g–1000 m²/g.

15. The mesoporous molecular sieve according to claim 1, wherein said molecular sieve has a pore volume of 0.40 ml/g–0.70 ml/g, and a specific surface area of 500 m²/g–800 m²/g.

16. The mesoporous molecular sieve according to claim 1, wherein per 100 g of said molecular sieve has adsorption capacity towards benzene of more than 10 g at 2500 and $P_s/P_O$=0.016, and per 100 g of said molecular sieve has adsorption capacity towards water of more than 50 g at 2500 and $P_s/P_O 0.026$.

17. The mesoporous molecular sieve according to claim 16, wherein per 100 g of said molecular sieve has adsorption capacity towards benzene of 12 g–25 g at 25° C. and $P_s/P_O=0.016$, and per 100 g of said molecular sieve has adsorption capacity towards water of 52 g–70 g at 25° C. and $P_s/P_O 0.026$.

18. The mesoporous molecular sieve according to claim 1, wherein said molecular sieve is so thermally and hydrothermally stable that its crystal lattice is not damaged after being calcined at 700° C. for 2 h, and its crystallinity is not substantively decreased after being heated in boiling water for 10 h.

19. The mesoporous molecular sieve according to claim 9, wherein said metal element(s) is one or more selected from the group consisting of La, Ce, Ti, Ni, Go, Cr, Ca, Cu, Zn, Mg and Fe.

20. A process for preparation of the molecular sieve according to claim 1, comprising the steps of:
(a) mixing a template, an aluminum source, and a phosphorus source with water, stirring the mixture and adjusting the pH value of the mixture to range from 6 to less than 9, wherein the molar ratios of various materials $P_2O_5/Al_2O_3=0.5-1.5$, $H_2O/Al_2O_3=50-500$, $R/Al_2O_3=0.2-2.0$, where R is a template;
(b) crystallizing the resulting mixture from step (a) to form a precipitate recovering and washing and drying the solid product to obtain the as-synthesised mesoporous molecular sieve, and
(c) calcining the as-synthesised molecular sieve to remove the template to obtain the molecular sieve.

21. The process according to claim 20, wherein the molar ratios of various materials in the mixture $P_2O_5/Al_2O_3=0.7-1.3$, $H_2O/Al_2O_3=100-400$, and $R/Al_2O_3=0.3-1.0$, wherein R is a template.

22. The process according to claim 20, wherein the molar ratio of phosphorus to aluminum in the mixture $P_2O_5/Al_2O_3=0.7-1.0$.

23. The process according to claim 20, wherein one or more silicon sources and/or titanium sources is optionally added in step (a) to allow a $T/Al_2O_3$ molar ratio in the mixture to be from 0.01 to less than 2.0, wherein T represents Si and/or Ti.

24. The process according to claim 23, wherein said $T/Al_2O_3$ molar ratio is 0.01–1.0, wherein T is Si and/or Ti.

25. The process according to claim 23, wherein said $T/Al_2O_3$ molar ratio is 0.1–0.5, wherein T is Si and/or Ti.

26. The process according to claim 20, wherein other metal source(s) in addition to the aluminum sources are optionally added where necessary to allow a $M/Al_2O_3$ molar ratio in the mixture obtained in step (a) to be 0.01–2.0, wherein M represents the other metal element(s).

27. The process according to claim 20, wherein other metal source(s) in addition to the aluminum sources are optionally added where necessary to allow a $M/Al_2O_3$ molar ratio in the mixture obtained in step (a) to be 0.01–1.0, wherein M represents the other metal element(s).

28. The process according to claim 20, wherein other metal source(s) in addition to the aluminum sources are optionally added where necessary to allow a $M/Al_2O_3$ molar ratio in the mixture obtained in step (a) to be 0.1–0.5, wherein M represents the other metal element(s).

29. The process according to claim 20, wherein said aluminum source is one or more selected from the group consisting of active aluminas and their precursors, soluble aluminum salts and organic aluminium-containing compounds.

30. The process according to claim 20, wherein said phosphorus source may be an inorganic and/or organic compound containing phosphorus.

31. The process according to claim 20, wherein said phosphorus source is orthophosphoric acid, phosphoric acid, pyrophosphoric acid, phosphorus trichloride, phosphorus oxychloride, and/or phosphate.

32. The process according to claim 20, wherein said phosphorus source is ortho-phosphoric acid.

33. The process according to claim 20, wherein said silicon source is one or more selected from the group consisting of silica sol, white carbon black, water glass, and ortho-silicate.

34. The process according to claim 20, wherein said titanium source is one or more selected from the group consisting of $TiO_2$, $TiF_4$, $TiCl_4$, $TiOCl_2$, $Ti(SO_4)_2$, tetramethyl titanate, tetraethyl titanate, tetrapropyl titanate, and the derivatives thereof.

35. The process according to claim 26, wherein said other metal source(s) is one selected from the group consisting of the compounds of La, Ce, Ti, Ni, Co, Cr, Ca, Cu, Zn, Mg and Fe, or a mixture thereof.

36. The process according to claim 35, wherein said metal source(s) is soluble metal salt(s).

37. The process according to claim 36, wherein said metal source(s) is one or more selected from the group consisting of the nitrate, sulfate, acetate and chloride of the metal(s).

38. The process according to claim 20, wherein said template is represented by the general formula: $R_1R_2R_3R_4NX$, wherein $R_1$, $R_2$, $R_3$, and $R_4$ independently represent a substituting group, N represents element nitrogen or phosphorus, and X represents hydroxyl or halogen.

39. The process according to claim 38, wherein said halogen is selected from the group consisting of F, Cl, Br, and I, or a mixture thereof.

40. The process according to claim 38, wherein at least one substituting group among $R_1$, $R_2$, $R_3$, and $R_4$ is that having 5 or more carbon atoms.

41. The process according to claim 38, wherein at least one substituting group among $R_1$, $R_2$, $R_3$, and $R_4$ is that containing one or more polar functional groups.

42. The process according to claim 41, wherein said functional group is selected from the group consisting of amino, hydroxyl, carboxyl, sulfhydryl, aldehyde group, and halogen.

43. The process according to claim 20, wherein said template is a mixture of phenethoxy-2-hydroxypropyl trimethylammonium chloride (PTMAC) and/or phenethoxy-2-hydroxypropyl trimethylammonium bromide (PTMAB) with other organic compounds capable to serve as a template.

44. The process according to claim 20, wherein said template is phenethoxy-2-hydroxypropyl trimethylammonium chloride (PTMAC) and/or phenethoxy-2-hydroxypropyl trimethylammonium bromide (PTMAB).

45. The process according to claim 20, wherein the substance used to adjust the pH value of the mixture is an acid, base and/or salt capable of adjusting acidity and alkalinity.

46. The process according to claim 45, wherein said base is an inorganic alkali or organic alkali.

47. The process according to claim 45, wherein said base is selected from the group consisting of sodium hydroxide, potassium hydroxide, aqueous ammonia, primary amines, secondary amines, tertiary amines and quaternary ammonium alkali.

48. The process according to claim 47, wherein said base is selected from the group consisting of aqueous ammonia and quaternary ammonium alkali.

49. The process according to claim 20, wherein a crystallization temperature in step (b) is 100° C.–200° C. and a crystallization time is 4–240 h.

50. The process according to claim 49, wherein said the temperature is 130° C.–170° C., and the time period is 24–96 h.

51. The process according to claim 20, wherein a calcination temperature in step (c) is 450° C.–700° C., and a calcination time is 2–24 h.

52. The process according to claim 51, wherein said calcination temperature is 500° C.–650° C., and said calcination time is 4–8 h.

* * * * *